Nov. 1, 1955  K. R. BIXBY  2,722,314

NON-BLINDING SCREEN

Filed Aug. 31, 1954

INVENTOR.
Kenneth R. Bixby
BY
His Attorneys

United States Patent Office 2,722,314
Patented Nov. 1, 1955

2,722,314

NON-BLINDING SCREEN

Kenneth R. Bixby, Galesburg, Ill.

Application August 31, 1954, Serial No. 453,210

4 Claims. (Cl. 209—379)

This invention relates to a non-blinding screen and more particularly to a screen that is provided with a plurality of top or longitudinal rods held in spaced relation by tie rods, the tie rods being provided with means for dislodging the screened material, thereby preventing blinding.

In screening materials having a sticky nature, difficulty is encountered at times, in that the material to be screened does adhere to the bars to a greater or lesser extent. In extreme cases the entire surface of a screen will be coated over, filling in all screen openings. This condition is commonly referred to as "blinding." Some screen portions are adversely affected even when blinding occurs to a limited extent. It is desirable to have all screen openings clear and free of obstructions, permitting maximum screening efficiency.

An object of this invention is to construct a screen surface that will be free of blinding. This is accomplished by providing longitudinal rods supported upon transverse rods, the spacing of the rods depending upon the nature of the material to be screened. The screeen is vibrated in any suitable manner as for example by the use of a machine in which the screen is mounted. The vibrations, however, may not be enough to prevent blinding completely. Usually, the build-up occurs at the tie rods. The build-up at the tie rods may be eliminated, or greatly reduced, by providing rings loosely mounted on the tie rods between the longitudinal rods. These rings may be made of rubber, rubber-coated steel, steel, or chains woven or otherwise. The cross sectional area or shape is selected so as to best meet the requirements of the particular material to be screened. For example, the cross sectional area of the rings may be round, square, flat or in groups of thin washers. The vibration or motion imparted by the machine to the screen causes the rings to oscillate and rotate about the tie rods, to thereby dislodge any material that tends to stick at the tie rods.

Other objects and advantages reside in the construction of parts, the combination thereof and the mode of operation, as will become more apparent from the following description.

Figure 1:
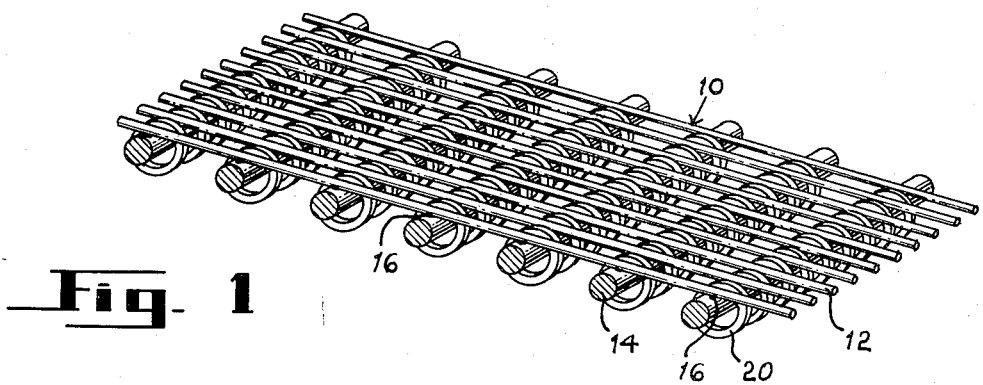

In the drawings, Figure 1 is a perspective view of a portion of a screen that may be mounted in any suitable machine used in screening material.

Figure 2:
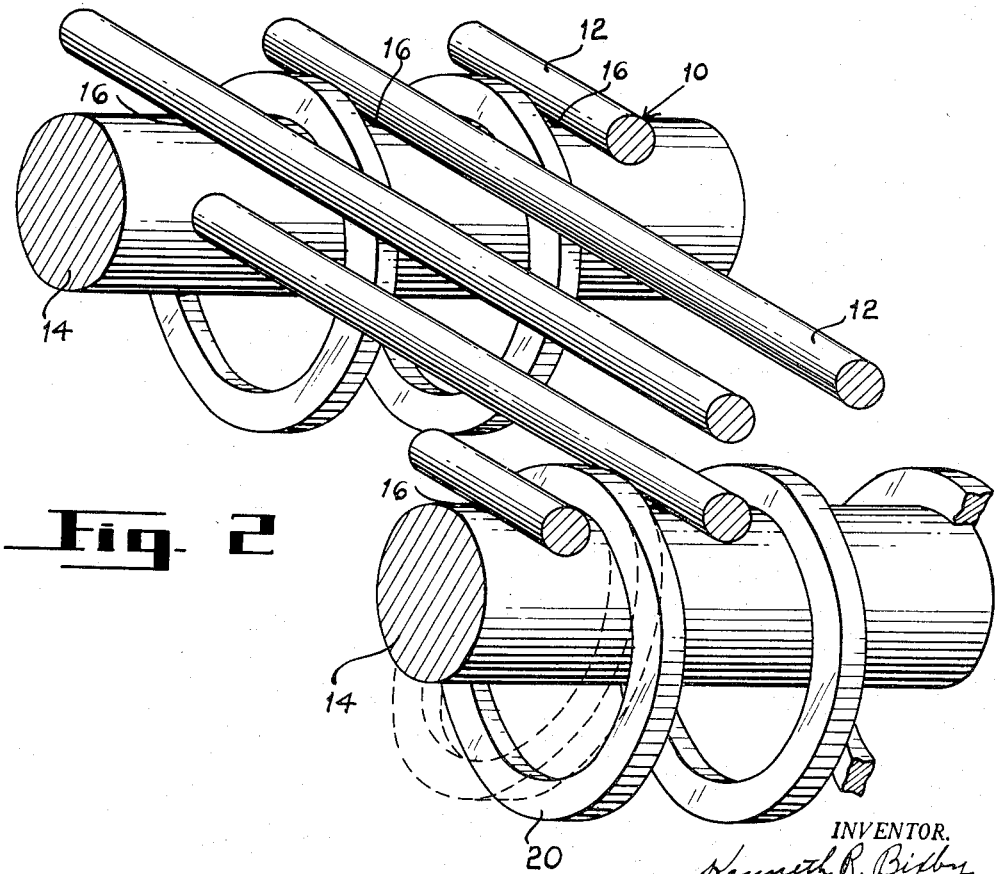

Figure 2 is an enlarged, fragmentary, sectional view showing the longitudinal rods together with the tie rods, having rings mounted thereon.

In the drawings, the reference character 10 indicates a screen provided with top or longitudinal rods 12 mounted upon tie rods 14. The longitudinal rods are welded or otherwise secured to the tie rods 14. The spacing of the longitudinal rods depends upon the particular requirements. These may be anywhere from 2½" to 10" apart, more or less. These rods 12 may be round or any other suitable shape. The spacing of the tie rods may be anywhere from 8 to 15" apart, depending entirely upon the particular requirements, as for example, the weight of the material, the size of the screen, the dimensions of the rods, et cetera. The longitudinal rods 10 and the tie rods 12 are welded together at 16. Although round rods have been shown, these rods need not necessarily be round, and, as a matter of fact, any suitable screen may be used having slots or openings for the screening of the material. These openings may be bounded by longitudinal portions, that is, portions of the rods 12, and transversely disposed supporting portions, that is, portions of the rods 14.

Rings 20 are loosely mounted upon the tie rod, there being one ring between each pair of longitudinal rods. The inside diameter of the rings is considerably greater than the diameter or the maximum dimensions of the tie rods 14 or the transversely disposed portions bounding the openings. The width of the rings is less than the width of the opening. Instead of one ring, several rings may be mounted on the transverse portion between each pair of longitudinal portions. These rings move relative to the screen when the screen is vibrated or shaken. Due to the inertia, it is obvious that the rings 20 will move relative to the tie rods 14 and relative to the longitudinal rods 12. This relative movement between the rings and the screen prevents the material from sticking in the vicinity of the juncture of the longitudinal rods and the tie rods. By removing the material that tends to lodge in this vulnerable area, the chances of blinding the screen are greatly reduced and, in most cases, completely eliminated. Although longitudinal top rods and transverse tie rods have been shown, the rings 20 may be used with screens of other construction. The rings may be mounted upon any transversely disposed structure.

Although the preferred embodiment of the device has been described it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A non-blinding screen comprising intersecting rod elements, freely movable means mounted on some of said elements for providing dislodgement of material from said rod elements when said screen is agitated, said means comprising rings larger in diameter than the rod elements upon which they are mounted, the inner diameter of said rings being substantially twice the diameter of said transverse portions.

2. A screen assembly wherein the main body includes longitudinal portions and transverse portions forming openings, said screen assembly being adapted to be vibrated, said screen assembly being characterized by rings loosely mounted upon the transverse portions so that as the screen assembly is vibrated the rings move relative to the transverse portions to dislodge any screening material that lodges in the vicinity of the transverse portions, the inner diameter of said rings being substantially twice the diameter of said transverse portions.

3. In a screening machine comprising a plurality of equally spaced longitudinally extending rods supported on a plurality of equally spaced transversely disposed rods so as to form screening openings therebetween, said screening machine adapted to be vibrated, a plurality of rings loosely mounted on each transverse rod and positioned between adjacent longitudinal rods, the inner diameter of said rings being at least twice the diameter of said transverse rods to permit substantial vertical movement as well as horizontal movement of the rings with respect to the transverse rods to prevent clogging of the openings.

4. In a screening machine comprising a plurality of equally spaced longitudinally extending rods fixed to a plurality of equally spaced transversely disposed rods so as to form screening openings therebetween, said screening machine adapted to be vibrated, a plurality of rings loosely mounted on each transverse rod and positioned between adjacent longitudinal rods, the inner diameter of said rings being approximately twice the diameter of said transverse rods so that upon the screening machine being vibrated the pivotal point of each ring varies with respect to its transverse rod thereby preventing blinding.

References Cited in the file of this patent

UNITED STATES PATENTS

| | | |
|---|---|---|
| 1,213,239 | Noll | Jan. 23, 1917 |
| 1,333,727 | Philippi | Mar. 16, 1920 |

FOREIGN PATENTS

| | | |
|---|---|---|
| 1,951 | Netherlands | Mar. 18, 1917 |
| 13,685 | Great Britain | July 17, 1895 |